Aug. 7, 1945.  E. F. HAGEN ET AL  2,381,349
CLAMP
Filed Nov. 29, 1943
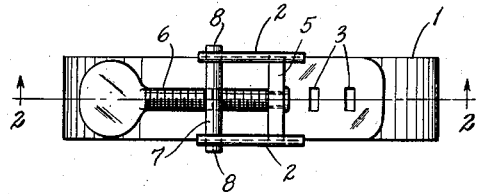
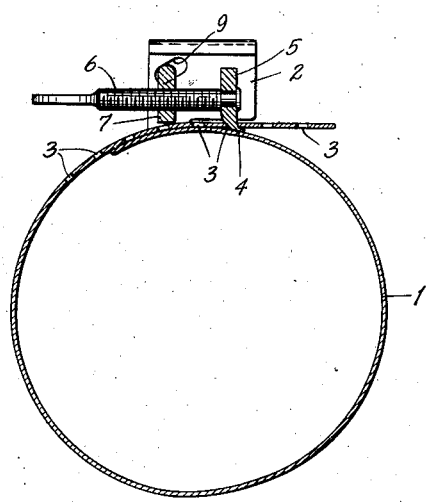
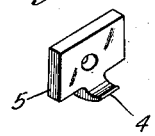
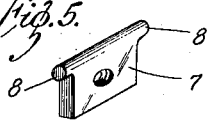
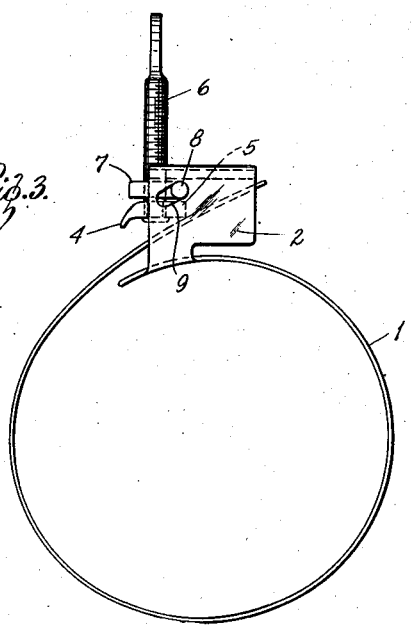
INVENTORS:
EUGENE F. HAGEN,
HERBERT E. MUENCH,
BY John H. Cassidy
THEIR ATTORNEY.

Patented Aug. 7, 1945

2,381,349

UNITED STATES PATENT OFFICE 2,381,349

CLAMP

Eugene F. Hagen, St. Louis, and Herbert E. Muench, University City, Mo.

Application November 29, 1943, Serial No. 512,140

1 Claim. (Cl. 24—19)

This invention relates to a clamp for use about a hose or similar object.

The object of the invention is to produce a clamp of the character described, which will be simple and economical in construction and facile in operation.

A preferred embodiment of the invention is illustrated in the accompanying drawing.

Fig. 1 is a top plan view of the clamp;

Fig. 2 is a vertical section on line 2—2, Fig. 1;

Fig. 3 is an end elevational view;

Fig. 4 is a perspective of a dog which is a part of the clamp; and

Fig. 5 is a perspective view of a nut employed in the clamp.

A strap 1 has a bracket comprising ears 2 laterally extending at or near one end of the strap 1. The other end of the strap 1, when placed about an object, passes over the first end of the strap and has preferably a plurality of slots or holes 3 therethrough for engagement by a lug 4 on a dog 5.

The dog 5 is a part of an engaging assembly which includes the dog, a thumb screw 6 and a nut 7, all of which is pivotally supported by and between the ears 2. The nut 7 has a pair of extending trunnions 8 which engage in slots 9, one in each of the ears 2. The screw 6 is threaded in the nut 7 while the dog 5 is swivelled on its outer end, as best shown in Fig. 2.

The pivotal connection between the advancing assembly just described and the ears 2 is provided by means of a slot 9, since the slots provide necessary clearance when the advancing screw assembly is rotated.

In operation we may assume that the clamp is in the position shown in Fig. 3 about an object such as a hose. The screw and its assembly is then rotated in a counterclockwise direction, the lug 4 engaging in one of the holes 3 and advancing the free end of the strap 1. Then the screw may be turned to complete the tightening of the strap 1. The turning of the screw will advance the dog 5 in a manner readily understood from the foregoing description and the drawing.

It will be obvious from the foregoing description that the invention accomplishes its object. The device is simple in construction and therefore economical to manufacture. That it is facile in operation can readily be seen. Various changes in the details of construction, within the scope of the appended claim, may be made without departing from the spirit of this invention. Improvements may be added thereto while retaining the functions and results of the invention.

We claim:

A clamp including a strap adapted to surround an object such as a hose, laterally extending ears at one end of the strap, the other end having one or more holes therethrough and overlapping the first end, a nut pivotally mounted on and between the ears, a screw threaded in the nut, a dog swivelled on the outer end of the screw and adapted to engage in said holes, constructed and arranged whereby the nut with the screw and dog may be rotated as a whole on the pivot of the nut to engage the dog in one of said holes and tighten the strap about the object on which it may be placed, and then the strap may be further tightened by rotating the screw and thereby advancing the dog.

EUGENE F. HAGEN.
HERBERT E. MUENCH.